United States Patent
Maruyama et al.

(10) Patent No.: US 7,600,244 B2
(45) Date of Patent: Oct. 6, 2009

(54) METHOD FOR EXTRACTING PROGRAM AND APPARATUS FOR EXTRACTING PROGRAM

(75) Inventors: Kazuna Maruyama, Tokyo (JP); Yasushi Shikata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 901 days.

(21) Appl. No.: 11/001,064

(22) Filed: Dec. 2, 2004

(65) Prior Publication Data
US 2005/0125844 A1   Jun. 9, 2005

(30) Foreign Application Priority Data
Dec. 5, 2003   (JP) .............................. 2003-408001

(51) Int. Cl.
*G06F 13/00* (2006.01)
(52) U.S. Cl. .............................. 725/47; 725/32; 725/58
(58) Field of Classification Search .................. 725/44, 725/45, 46, 47, 100, 101, 103, 144, 145
See application file for complete search history.

(56) References Cited

U.S. PATENT DOCUMENTS

| | | | | |
|---|---|---|---|---|
| 5,798,785 | A * | 8/1998 | Hendricks et al. | 725/46 |
| 5,828,945 | A | 10/1998 | Klosterman | 455/4.2 |
| 6,151,444 | A * | 11/2000 | Abecassis | 386/125 |
| 6,177,931 | B1 * | 1/2001 | Alexander et al. | 725/52 |
| 6,408,128 | B1 * | 6/2002 | Abecassis | 386/68 |
| 2002/0038457 | A1 | 3/2002 | Numata et al. | 725/47 |
| 2002/0120925 | A1 * | 8/2002 | Logan | 725/9 |
| 2002/0174430 | A1 * | 11/2002 | Ellis et al. | 725/46 |
| 2003/0033174 | A1 | 2/2003 | Ikeda et al. | 705/5 |
| 2003/0093790 | A1 * | 5/2003 | Logan et al. | 725/38 |
| 2003/0130979 | A1 | 7/2003 | Matz et al. | 707/1 |
| 2003/0174248 | A1 | 9/2003 | Maruyama | 348/563 |
| 2004/0103436 | A1 * | 5/2004 | Shikata et al. | 725/83 |

FOREIGN PATENT DOCUMENTS

| | | |
|---|---|---|
| EP | 1 193 968 | 4/2002 |
| EP | 1 289 296 | 3/2003 |
| JP | 2002-112142 | 4/2002 |
| JP | 2003-61000 | 2/2003 |
| WO | WO 00/52928 | 9/2000 |

* cited by examiner

*Primary Examiner*—Brian T Pendleton
*Assistant Examiner*—Cai Chen
(74) *Attorney, Agent, or Firm*—Fitzpatrick, Cella, Harper & Scinto

(57) ABSTRACT

This method facilitates an operation of selecting one program from among a plurality of programs, each having the substantially same content without placing burden on the user, and in particular, an operation of extracting an upward compatible program. The method retrieves a program scheduled to be broadcast having the same content as a pre-recorded program and extracts a difference between the pre-recorded program and the scheduled program and, in the event that the difference satisfies a predetermined criterion of determination, notifies the result to the user. When the difference is extracted, the method gives a plurality of meta data related to each program the order of priority based on information of user's taste and compares the meta data corresponding to each other and extracts an upward compatible program based on the order of priority and the comparison result.

9 Claims, 15 Drawing Sheets

```
<PROGRAM INFORMATION TABLE>
  <TITLE> A CUP PRELIMINARY </TITLE>
  <GENRE TYPE = "MAIN"> SPORT </GENRE>
  <GENRE TYPE = "SUBORDINATE"> FOOTBALL </GENRE>
  <CREDIT LIST>
    <CREDIT ITEM ROLE = LIVE BROADCAST">
      <NAME> ○山△男 </NAME>
    </CREDIT ITEM>
    <CREDIT ITEM ROLE = "COMMENTATOR">
      <NAME> ◇川☆子 </NAME>
    </CREDIT ITEM>
  </CREDIT LIST>
  <DESCRIPTION INFORMATION>
    <DATE AND TIME OF DESCRIPTION> JULY 1, 2003 </DATE AND TIME OF DESCRIPTION>
    <SITE OF DESCRIPTION> PARIS, FRANCE </SITE OF DESCRIPTION>
  </DESCRIPTION INFORMATION>
</PROGRAM INFORMATION TABLE>
</PROGRAM POSITION INFORMATION>
  <BROADCAST EVENT>
    <STARTING TIME> 21:00:00, JULY 1, 2003 </STARTING TIME>
    <DURATION> 120 MINUTES </DURATION>
    <LIVE> TRUE </LIVE>
    <FREE OF CHARGE> FALSE </FREE OF CHARGE>
  </BROADCAST EVENT>
</PROGRAM POSITION INFORMATION>
```

*Fig. 2*

| | DATE AND TIME OF BROADCAST | DURATION | CHANNEL | GENRE | SUB-GENRE | NAME OF PROGRAM | LIVE | DATE AND TIME OF DESCRIPTION | SITE OF DESCRIPTION | PLAY-BY-PLAY ANNOUNCER | COMMEN-TATOR | SEGMENT |
|---|---|---|---|---|---|---|---|---|---|---|---|---|
| PRE-RECORDED | 2003.07.01 | 120 | 123 | SPORT | FOOTBALL | A CUP PRELIMINARY | TRUE | 2003.07.01 | FRANCE, PARIS | O山△男 | O川★子 | ABSENCE |
| BROADCAST SCHEDULE | 2003.07.08 | 120 | 99 | SPORT | FOOTBALL | A CUP PRELIMINARY | FALSE | 2003.07.01 | FRANCE, PARIS | O山△男 | O川★子 | PRESENCE |

Fig. 4

| GENRE [SPORT] | SUB-GENRE [ALL] | |
|---|---|---|
| ORDER OF PRIORITY | | SET VALUE OF HIGHER PRIORITY |
| 2 | DURATION | ✓ LONG  SHORT |
| 3 | LIVE FLAG | ✓ TRUE  FALSE |
| 5 | PLAY-BY-PLAY ANNOUNCER | ✓ PRESENCE  ABSENCE |
| 4 | COMMENTATOR | ✓ PRESENCE  ABSENCE |
| 1 | SEGMENT META | ✓ PRESENCE  ABSENCE |

Fig. 6

| GENRE [SPORT] ||
|---|---|
| KIND OF META | POINT |
| DURATION | 4 |
| LIVE FLAG | 3 |
| PLAY-BY-PLAY ANNOUNCER | 1 |
| COMMENTATOR | 2 |
| SEGMENT META | 5 |

*Fig. 7*

UPWARD COMPATIBLE PROGRAM IS SCHEDULED
TO BE BROADCAST

PRE-RECORDED PROGRAM:    SEGMENT ABSENCE

PROGRAM SCHEDULED TO BE BROADCAST:
SEGMENT PRESENCE

ARE YOU MAKING A RESERVATION OF
RECORDING THIS PROGRAM?

YES    NO

*Fig. 8*

| | DATE AND TIME OF BROADCAST | DURATION | CHANNEL | GENRE | SUB-GENRE | NAME OF PROGRAM | SUBTITLE | SOUND LANGUAGE | YEAR OF PRODUC-TION | COUNTRY OF PRODUC-TION | DIRECTOR | LEADING PERFORMER |
|---|---|---|---|---|---|---|---|---|---|---|---|---|
| PRE-RECORDED | 2003.07.01 | 120 | 123 | MOVIE | SF | PLANET A | ABSENCE | DUBBING | 2000 | FRANCE | Jean O△ | Agnis ☆ |
| BROADCAST SCHEDULE | 2003.07.08 | 120 | 99 | MOVIE | SF | PLANET A | PRESENCE | BILINGUAL | 2000 | FRANCE | Jean O△ | Agnis ☆ |

*Fig. 10*

|  | PRE-RECORDED | SCHEDULED TO BE BROADCAST |
|---|---|---|
| DATE AND TIME OF BROADCAST | 2003.07.01 | 2003.07.08 |
| DURATION | 120 | 120 |
| CHANNEL | 123 | 99 |
| GENRE | SPORT | SPORT |
| SUB-GENRE | FOOTBALL | FOOTBALL |
| NAME OF PROGRAM | A CUP PRELIMINARY | A CUP PRELIMINARY |
| LIVE | TRUE | FALSE |
| DATE AND TIME OF DESCRIPTION | 2003.07.01 | 2003.07.01 |
| SITE OF DESCRIPTION | FRANCE, PARIS | FRANCE, PARIS |
| PLAY-BY-PLAY ANNOUNCER | ○山△男 | ○山△男 |
| COMMENTATOR | ◇川☆子 | ◇川☆子 |
| SEGMENT | ABSENCE | PRESENCE |

*Fig.15*

METHOD FOR EXTRACTING PROGRAM AND APPARATUS FOR EXTRACTING PROGRAM

BACKGROUND OF THE INVENTION

1. Field of the Invention

This invention relates to a method for extracting a program and an apparatus for extracting a program and in particular, is suitably applied to a method for extracting an upward compatible program that can be replaced for another program of a plurality of programs having the same contents, and to such an apparatus for extracting an upward compatible program that is mounted with this method.

2. Description of the Related Art

In currently-used analog broadcast and digital broadcast and in terrestrial digital broadcast scheduled to be started at the end of 2003, in addition to a program, information related to the program (meta data) is transmitted. The meta data is data such as the date and time of broadcast, channel information, and the title and genre of the program.

Further, meta data that is to be handled in server type broadcast being now standardized can handle more detailed information as compared with meta data used in currently-used BS digital broadcast and the like. The meta data in the server type broadcast includes not only information such as title and genre but also various information, e.g., credit information such as performers and staffs of program, and alarm information to show the degree of description of violence and sex.

The meta data is transmitted before actual broadcast and a typical function using the meta data receiving in advance is an electronic program guide (EPG). The electronic program guide is a function of displaying channel, broadcast time, and program title, which are meta data, on a screen and displays genres in different colors and by different marks, detailed information such as commentators and performers, and information for limiting the age of a viewer such as parental guidance, and selects the station of a selected program and records a program and makes a reservation of recording a program, thereby assisting a user's viewing and scheduling.

TVs, tuners, and recorders mounted with the electronic program guide and internet electronic program guides have come into common use. A function of retrieving a program related to a specific program (program of the next time and repeat of program) and making a reservation of recording the program is known, as a schedule assistance technology using an electronic program guide.

Further, a function using this meta data includes also a program recommendation function. The program recommendation function utilizing program-related information includes: a filter type recommendation function of having a user having registered the genres of favorite programs and the names of favorite talents and of recommending a program meeting the information of this user's taste; a learning type recommendation function of extracting the information of a user's taste from the meta data of programs that the user viewed or recorded in the past and from the information of a user's operation history and of recommending a program based on the information of the user's taste; and a recommendation function of a combination type of both of these functions.

However, in the schedule assistance utilizing the electronic program guide, it is information related to a mode in which the contents of the program are broadcast such as channel and the date and time of broadcast, and is not information related to the contents of the program that the user can know as information related to the related program. For this reason, even if there is difference in the information related to the contents of the program such as subtitle and sound language between the related programs, it is difficult for the user to notice the difference. In the program recommendation function, there is a case where the program that has been already viewed or recorded by the user is also recommended as a recommendation program. Further, even when the broadcast conditions are different from those of the last time (for example, the same movie was broadcast last time in standard broadcast dubbed in Japanese and is broadcast this time in high-definition bilingual broadcast), the user needs to find the difference consciously to judge which program is upward compatible and to decide the handling of a program scheduled to be broadcast and a pre-recorded program.

SUMMARY OF THE INVENTION

Therefore, the object of this invention is to provide such a method for extracting a program that facilitates an operation of selecting one program from among a plurality of programs having the substantially same contents and in particular, an operation of extracting an upward compatible program and an apparatus using the method.

In order to achieve the above object, the first invention of this invention is a method for extracting a program, characterized by: retrieving a second program having the substantially same content as a first program; extracting difference between the first program and the second program; and providing a user with meta data of both of the programs in the event that there is the difference between both of the programs.

The second invention of this invention is a method for extracting a program, characterized by: retrieving a second program having the substantially same content as a first program; extracting difference between the first program and the second program; providing a user, in the event that the difference satisfies a predetermined criterion, with a result that the difference satisfies the predetermined criterion; giving a plurality of kinds of meta data related to each program the order of priority based on the information of user's taste and comparing the meta data corresponding to each other at the time of extracting the difference; and extracting a program based on the order of priority and the result of the comparison.

The third invention of this invention is an apparatus for extracting a program, characterized by: a same program retrieving part for retrieving a second program having the substantially same content as a first program; a difference extracting part for extracting difference between the first program and the second program; and a superiority/inferiority determining part for determining superiority or inferiority between the first program and the second program in the event that the difference is extracted, wherein the superiority/inferiority determining part has a function of: giving a plurality of meta data related to each program the order of priority based on the information of user's taste according to a predetermined criterion of determination; comparing meta data corresponding to each other; and making a determination of superiority or inferiority between the first program and second program based on the order of priority and the result of the comparison.

The fourth invention of this invention is a program capable of making a computer perform the method for extracting a program according to the first invention or the second invention.

According to this invention, it is possible to perform an operation of selecting one program from among a plurality of programs having the substantially same content and in particular, an operation of extracting an upward compatible program without placing burden on the user.

DESCRIPTION OF THE DRAWINGS

The invention, together with further advantages thereof, may best be understood by reference to the following description taken in conjunction with the accompanying drawings in which:

FIG. 2 shows examples of meta data of a program in the first embodiment of this invention;

FIG. 4 is an example of information of meta data of the same programs in the first embodiment of this invention;

FIG. 6 is an example of a screen for setting the order of priority in the first embodiment of this invention;

FIG. 7 is an example of a criterion of determination in the first embodiment of this invention;

FIG. 8 is an example of a screen for notifying a result in the first embodiment;

FIG. 10 is an example of information of meta data of the same programs in the second embodiment;

FIG. 15 is an example of a screen for providing meta data in the fifth embodiment.

DESCRIPTION OF THE PREFERRED EMBODIMENTS

The preferred embodiments of the invention will be described below in detail by reference to the accompanying drawings.

First Embodiment

Figure 1:
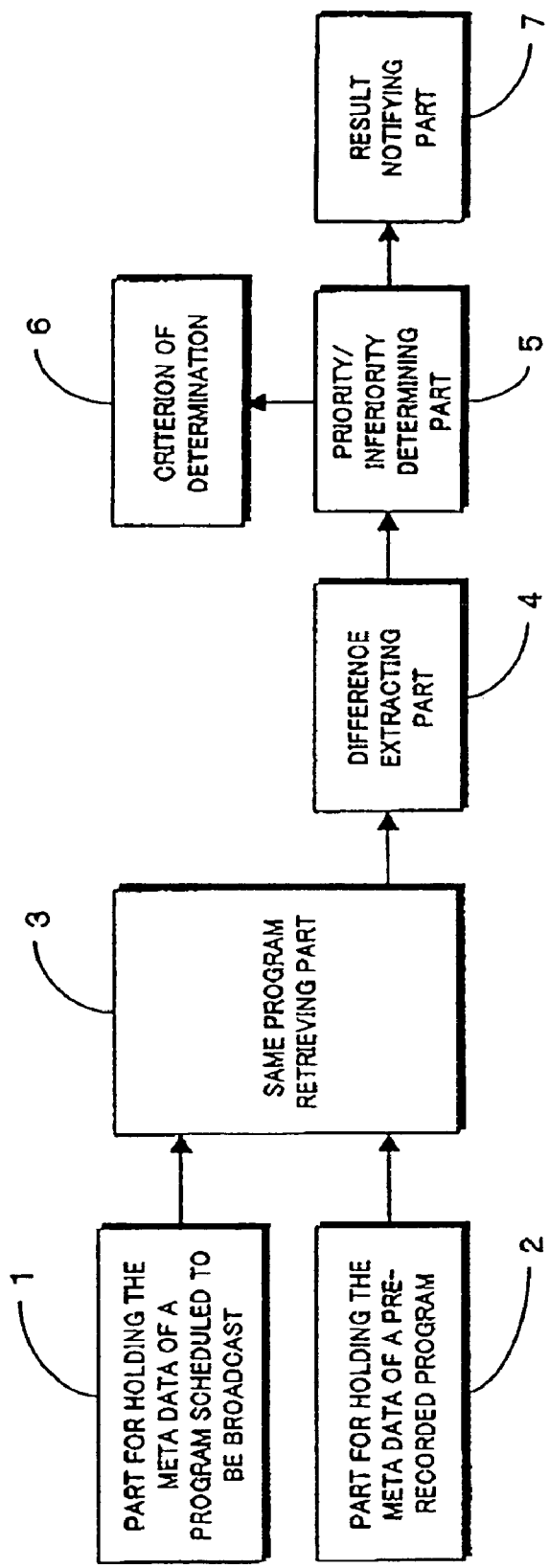
FIG. 1 is a function block diagram of a method for extracting an upward compatible program in the first embodiment of this invention.

In FIG. 1 is a function block diagram of a method for extracting an upward compatible program to which the first embodiment of the invention is applied.

A plurality of pre-recorded programs are stored in an accumulation region (not shown) of a hard disk or the like and the meta data of these pre-recorded programs is stored in a part 2 for holding the meta data of a pre-recorded program. The meta data of programs to be broadcast is stored in a part 1 for holding the meta data of a program scheduled to be broadcast. The meta data of programs to be broadcast is data acquired through a broadcast wave or a network and is updated periodically.

Further, a same program retrieving part 3 retrieves a program scheduled to be broadcast having the same contents as a pre-recorded program by the use of the meta data stored in the part 2 for holding the meta data of a pre-recorded program and the part 1 for holding the meta data of a program scheduled to be broadcast.

When there exists a program scheduled to be broadcast having the same contents as the pre-recorded program, difference in broadcast conditions is extracted by a difference extracting part 4 based on the meta data of both of the programs. As a result, when difference is extracted, the priority or inferiority of both of the programs is determined by a priority/inferiority determining part 5 by the use of a criterion of determination 6. When the program scheduled to be broadcast has priority as a result of determination made by the priority/inferiority determining part 5, the determination result is notified by a result notifying part 7.

Here, the part 1 for holding the meta data of a program scheduled to be broadcast and the part 2 for holding the meta data of a pre-recorded program are constituted of a storage device such as RAM and the same program retrieving part 3, the difference extracting part 4, and the priority/inferiority determining part 5 are constituted of a computer (CPU or MPU) executing a software (program) for realizing a processing of a method for extracting an upward compatible program, and the result notifying part 7 is constituted of a display or the like according to a notification method to be described later.

An apparatus for extracting an upward compatible program, which includes the part 1 for holding the meta data of a program scheduled to be broadcast, the part 2 for holding the meta data of a pre-recorded program, the same program retrieving part 3, the difference extracting part 4, and the priority/inferiority determining part 5, can be constituted, for example, as an image recording apparatus such as a hard disk recorder, or as a display device that further includes the result notifying part or still further includes a tuner for receiving broadcast in addition to the image recording apparatus and the display device, but is not limited to these apparatuses.

FIG. 2 shows examples of the meta data of a program. Information included in the meta data and related to a program includes, as information related to the contents of the program, not only title and genre but also credit information of the contents (name of producer and names of performers), production information of the contents (year of production and country of production), description information of the contents (era and site), and information related to audience (limitation to audience and audience envisioned). Information related to the mode in which the program content is broadcast includes, for example, broadcast schedule information (date and time of broadcast, live broadcast, repeat of broadcast), and information related to the program (title of program, attributes of image and sound).

The same program retrieving part 3 retrieves the same program mainly by using information related to the contents of the program of the meta data of the programs scheduled to be broadcast and the pre-recorded programs. For example, in movie programs, when the title, director, and leading performer of a program are the same as those of another program, these programs can be regarded as the same program, and in sport programs, when the date, time, and site of description of a program are the same as those of another program, these programs can be regarded as the same program.

Figure 3:
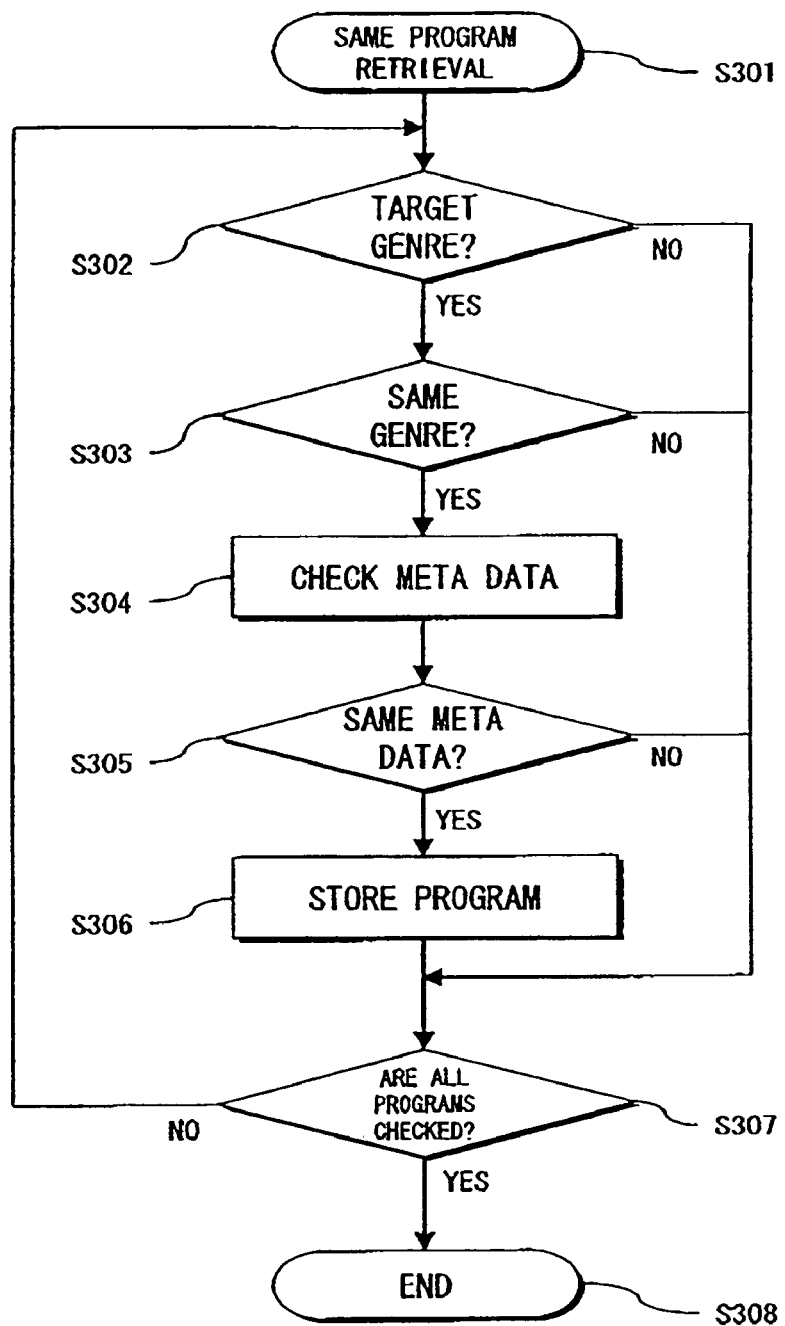
FIG. 3 is a flow chart of a processing of retrieving the same program in the first embodiment of this invention.

In FIG. 3 is shown a processing flow of a same program retrieval. It is assumed that the same program retrieval is started when the meta data of the program scheduled to be broadcast is updated and a recording schedule is made. When the same program retrieval is started (S301), it is checked whether or not this program scheduled to be broadcast is a target program of the same program retrieval by the use of genre information of meta data thereof (S302). The target program for the same program retrieval may be all programs or may be narrowed to programs related to a genre specified by a user or a genre determined from user's taste.

If this program scheduled to be broadcast is the target program of the same program retrieval (YES at S302), it is checked whether or not a genre to which this program scheduled to be broadcast belongs exists in pre-recorded programs (S303). On the other hand, if this program scheduled to be broadcast is not the target program of the same program retrieval (NO at S302), it is checked whether or not there is the next program scheduled to be broadcast (S307).

If a genre to which this program scheduled to be broadcast belongs exists in the pre-recorded programs (YES at S303), the contents of meta data of this program scheduled to be broadcast are checked against the contents of meta data of the pre-recorded program of the same genre (S304). It is assumed that which information included in the meta data is used for the checking of the contents of meta data is previously determined according to the genre of the contents. If a genre to which this program scheduled to be broadcast belongs does not exist in the pre-recorded programs (NO at S303), it is checked whether or not there is the next program scheduled to be broadcast (S307). If the meta data of the program scheduled to be broadcast and the meta data of the pre-recorded program of the same genre are equal to each other (YES at S305), these programs are regarded as the same program and a message to this effect is temporarily stored (S306), and it is checked whether or not there is the next program scheduled to be broadcast (S307).

If the meta data of the program scheduled to be broadcast and the meta data of the pre-recorded program of the same genre are not equal to each other (NO at S305), these programs are different from each other and then it is checked whether or not there is the next program scheduled to be broadcast (S307). If there is the next program scheduled to be broadcast (YES at S307), the same program retrieval is conducted for this program scheduled to be broadcast. If there is not the next program scheduled to be broadcast (NO at S307), the presence or absence of the same program is made a result and the same program retrieval is ended (S308).

The difference extracting part 4 extracts difference between two or more programs regarded as the same program by the same program retrieving part 3 by the use of the meta data of these programs.

FIG. 4 is an example of information included in the meta data of the pre-recorded program and the program scheduled to be broadcast that have the same contents. These programs are different in the date and time of broadcast and in channel but are regarded as the program of the same contents in terms of the date and time of description, site of description and sub-genre.

In the extracting of difference, difference is extracted by the use of information other than information used for the same program retrieval of the meta data of the program. Of the meta data, the information used for the extracting of difference is determined according to the genre of the program to be extracted. At this time, information determined according to the genre may be narrowed or added to by a user's specification or user's taste. For example, in the case where the genre is movie, difference such as feature program and director's cut program can be extracted by the use of meta data such as the year of production and subtitle in addition to the meta data related to image and sound information, and difference such as dubbing and bilingual broadcast can be extracted by the use of meta data related to subtitle and sound language. Further, for example, in the case where the genre is music, difference such as stereophonic sound and surround sound can be extracted by the use of meta data related to sound information, and the presence or absence of lyrics can be extracted by the use of meta data related to subtitle. Still further, in the case where the genre is sport, a longer program (which is thought to be longer because it includes the content of the latter half of game and interview) can be extracted by the use of meta data related to program duration, and difference can be extracted also from the meta data of a play-by-play announcer and a commentator and from the presence or absence of segment information. Here, the segment information is information used for determining the individual segments when one program is divided into a plurality of segments and refers to information such as segment starting position and interval. The segment information is used for the reproducing of digest and the like. For example, in the case where a football program shown in FIG. 4 has segments corresponding to a goal scene, a shoot scene, and a foul scene, when a user selects "goal scene", the digest of only the goal scene is reproduced.

Figure 5:
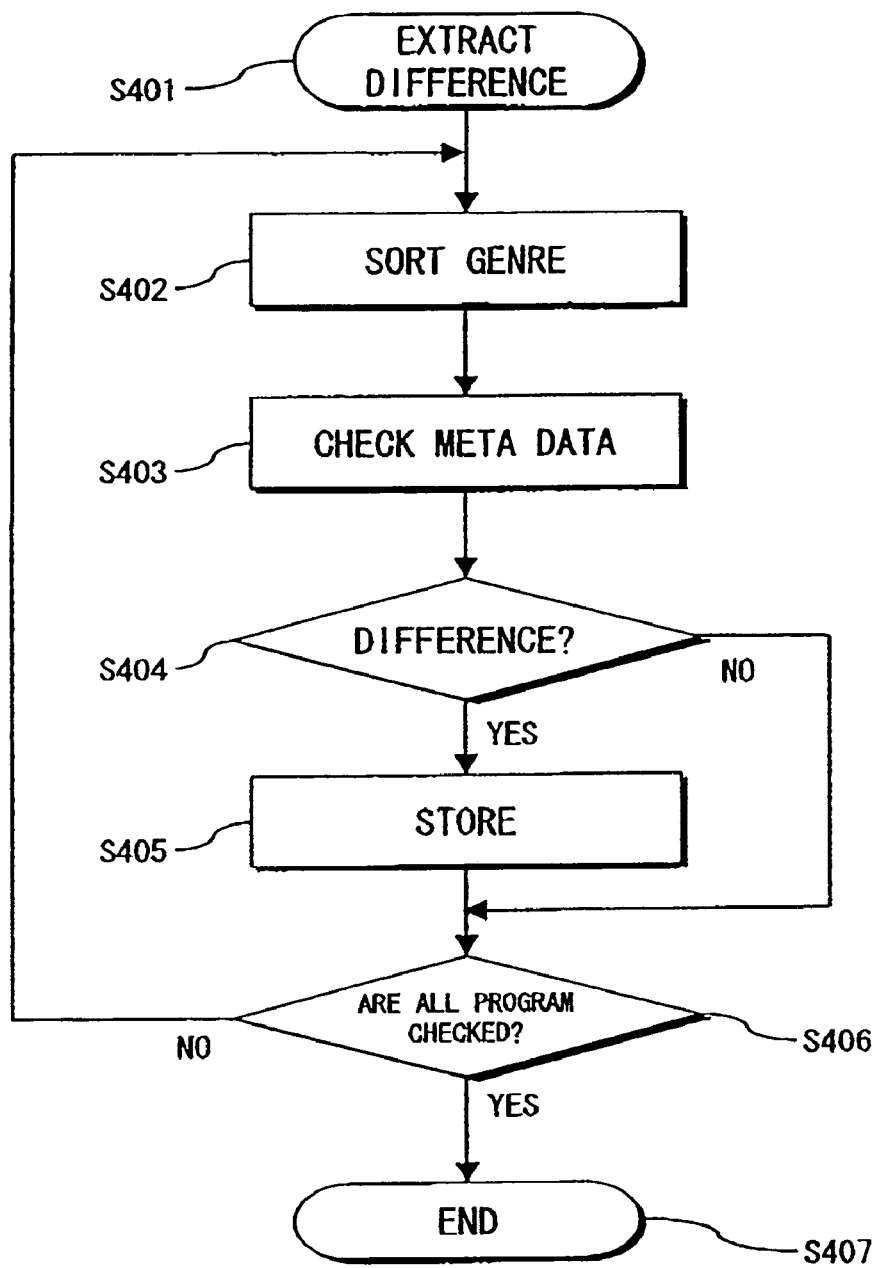
FIG. 5 is a flow chart of a processing of extracting difference in the first embodiment of this invention.

In this manner, the meta data used for the extracting of difference differs according to the genre of the program. In FIG. 5 is shown a flow chart of the processing of extracting difference.

As shown in FIG. 5, when the same program is found by the same programs retrieving part 3, the processing of extracting difference is started for these programs (S401). First, the genres of these programs are checked (S402) and the set values of meta data corresponding to this genre are checked (S403). In the example shown in FIG. 4, of the meta data of both programs, program duration, a live flag, the name of a commentator, the name of a play-by-play announcer, and segment information are checked for their set values.

If there is difference in the set values of these meta data (YES at S404), these programs and the contents of difference are stored (S405) and it is checked whether or not there are other same programs to be subjected to the processing of extracting difference (S406). If there is no difference in the set values of these meta data (NO at S404), it is checked whether or not there are other same programs to be subjected to the processing of extracting difference (S406). In the example shown in FIG. 4, the live flag and the presence or absence of the segment information are extracted as difference. If there are other same programs to be subjected to the processing of extracting difference (NO at S406), the processing of extracting difference is performed continuously, if there is not any other same program to be subjected to the processing of extracting difference (YES at S406), the extracted difference is made a result and the processing of extracting difference is ended (S407).

The priority/inferiority determining part 5 makes a priority/inferiority determination of two or more programs from which difference is extracted by the difference extracting part 4 by the use of the extracted difference and the criterion of determination 6. The criterion of determination 6 is such that sets the order of priority for the meta data used for extracting difference and the set values of meta data. The order of priority of these data is previously specified by the user.

In FIG. 6 is shown an example of a user-set screen. The contents of FIG. 6 correspond to those of FIG. 4. In the example shown in FIG. 6, the user sets, in a program whose genre is sport, "longer" for program duration, "true (live broadcast)" for a live flag, "presence" for a play-by-play announcer, "presence" for a commentator, and "presence" for segment information on the higher order of priority.

The order of priority can be set also in a manner other than the example shown in FIG. 6, for example, stepwise in the following manner: surround sound is at the highest order of priority, stereophonic sound is at the next lower order of priority, and monophonic sound is at the further next lower order of priority. Further, it is also possible to specify that the user does not need to take some meta data into account. For example, when the user does not mind what the settings of a play-by-play announcer and a commentator are, it is also possible not to give these meta data the order of priority and not to handle these meta data by the difference extracting part 4.

In the example shown in FIG. 6, the respective meta data are given higher priority in order of segment information, program duration, live flag, play-by-play announcer, and commentator. The criterion of determination 6 is determined based on the user's setting like this.

An example of the criterion of determination corresponding to the example shown in FIG. 6 is shown in FIG. 7. When a determination of superiority or inferiority of two programs shown in FIG. 4 is made by the use of the criterion of determination 6 shown in FIG. 7, the total of points allotted to the set values related to the live flag and the segment information which are differences extracted by the difference extracting part 4 becomes 5 for the program scheduled to be broadcast and 3 for the pre-recorded program, so that it is determined that the program scheduled to be broadcast that acquires many points is an upward compatible program.

Also in an example other than the example shown in FIG. 4, the total points of a program scheduled to be broadcast that has a longer duration because interview is added becomes 4, and if segment information is added to this, the total of points becomes 9. In this manner, by the use of the criterion of determination 6, it is possible to make a determination of upward compatibility for a various combination of the set values of meta data. If the total points becomes the same, upward compatibility can be determined from the order of priority of the meta data. Here, this criterion of determination 6 is held by a device or software mounted with a method for extracting an upward compatible program.

When it turns out as the result of determination made by the superiority/inferiority determining part 5 that there is a program scheduled to be broadcast that becomes upward compatible for a pre-recorded program, the result notifying part 7 notifies this result to the user.

In FIG. 8 is shown an example of a user notification screen. The contents of notification are not limited to those shown in FIG. 8. While a mode of notifying the result via the screen is used in this example, it is also recommendable to use a mode of lighting an LED mounted in a device or a mode of producing a specific sound.

Further, if a device mounted with the invention responds to a network, the result can be notified by the use of the network. For example, if a mail function is added to the result notifying part 7, when the result notifying part 7 makes a mail having contents corresponding to the contents of notification screen shown in FIG. 8 and sends the mail to the address stored in advance via a modem built in the device or connected to the outside, the result can be notified to the user.

If an access function to a specific server on the network is added to the result notifying part 7, when the result notifying part 7 stores an extracted upward compatible program and difference information in this specific server, the result can be notified to the user by a method corresponding to the function of the specific server.

If this specific server has a mail function, the result is notified to the user via the mail. If this specific server has a function of performing a remote control of a device mounted with the invention via a client device, when the user operates the client device, ex post facto processing such as reservation of recording of an upward compatible program related to the notification of result can be also performed. The method for notifying the result to the user by the use of the network function is only an example and is not all limited.

In this embodiment, while the upward compatible program has been extracted for the pre-recorded program and the program scheduled to be broadcast in this embodiment, if the same processing is performed for a program preset to be recorded and a program scheduled to be broadcast, and for a pre-recorded program and a program preset to be recorded and a program scheduled to be broadcast, the same effect can be produced.

According to the above-described embodiment, the same programs are retrieved by the use of the meta data of the pre-recorded program and the program scheduled to be broadcast and difference is extracted for the same programs and a superiority/inferiority determination is made from this difference and the criterion of determination specified by the user and as a result, when it is determined that the program scheduled to be broadcast is upward compatible, by notifying this determination result to the user, an upward compatible program for the user can be extracted without placing burden on the user.

Further, to store a software program code for realizing a processing described in the above embodiment in a computer (CPU or MPU) applied to a device mounted with a method for extracting an upward compatible program and to execute this program code is included within the scope of the invention. Still further, this program and a storage medium storing this program code (removable disk, floppy (registered trademark) disk, hard disk, optical disk, magnet-optical disk, CD-ROM, magnetic tape, nonvolatile memory card, ROM, and the like) also constitute the invention.

Second Embodiment

In this first embodiment, a case has been described where a superiority/inferiority determination between the same programs is made by the use of the criterion of determination specified by the user, but the superiority/inferiority determination can be also made by the use of the criterion of determination based on a user's taste extracted by operation history such as operations of viewing and recording performed in the past by the user.

Figure 9:
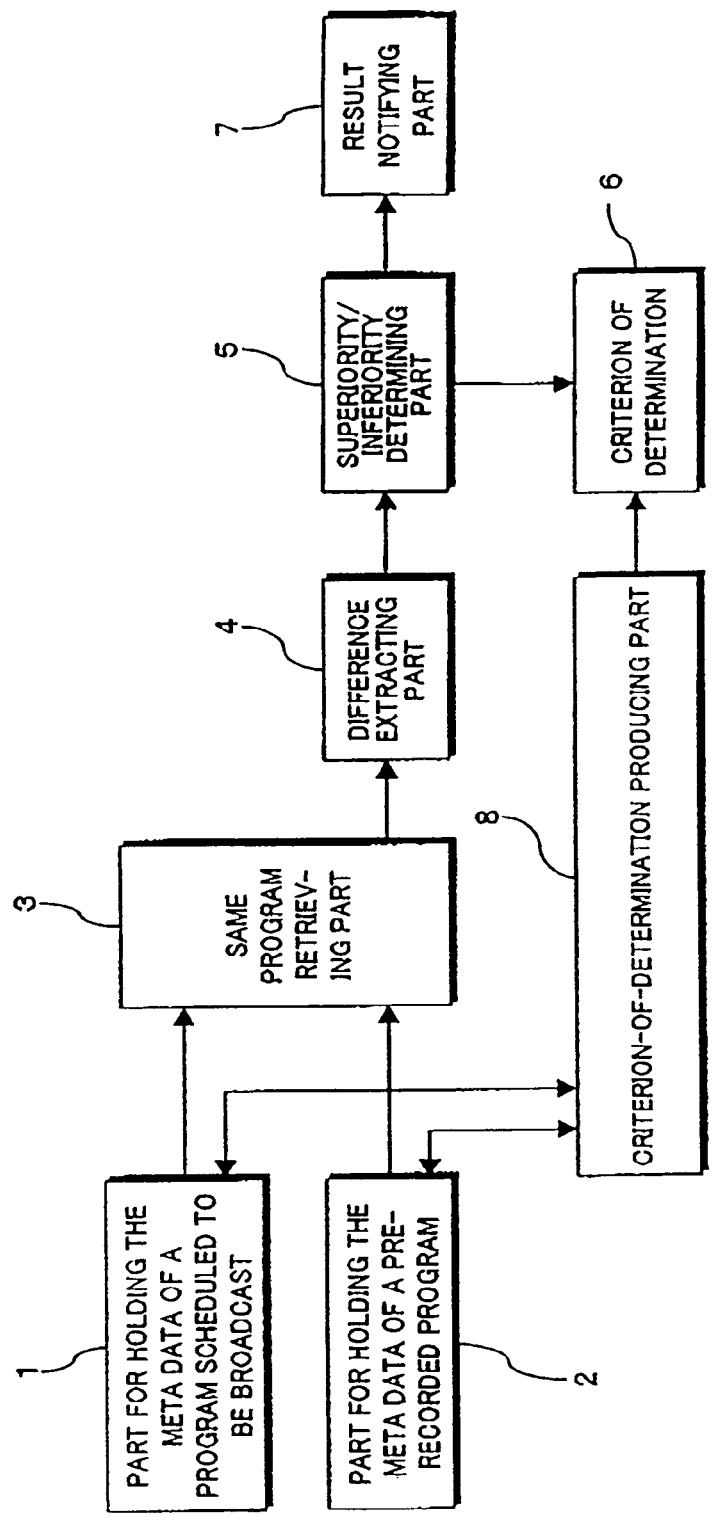
FIG. 9 is a function block diagram of a method for extracting an upward compatible program in the second embodiment of this invention.

FIG. 9 is a function block diagram of a method for extracting an upward compatible program to which the second embodiment of the invention is applied. Function blocks overlapping FIG. 1 are denoted by the same reference numerals. A plurality of pre-recorded programs are stored in an accumulation region (not shown) and the meta data of these pre-recorded programs is stored in the part 2 for holding the meta data of a pre-recorded program.

The meta data of the program scheduled to be broadcast is stored in the part 1 for holding the meta data of a program scheduled to be broadcast. The meta data of the program scheduled to be broadcast is data transmitted as a broadcast wave and is periodically updated.

The same program retrieving part 3 retrieves a program scheduled to be broadcast having the same contents as a pre-recorded program by the use of the meta data stored in the part 2 for holding the meta data of a pre-recorded program and the part 1 for holding the meta data of a program scheduled to be broadcast.

When there is a program scheduled to be broadcast having the same contents as a pre-recorded program, the difference extracting part 4 extracts difference in broadcast conditions by the use of the meta data of both of the programs. When the difference is extracted, the superiority/inferiority determining part 5 determines the superiority or inferiority of both of the programs by the use of the criterion of determination 6 produced by the criterion-of-determination producing part 8.

When the program scheduled to be broadcast holds superiority as the result of determination by the superiority/inferiority determining part 5, the result notifying part 7 notifies the determination result to the user. Here, the criterion-of-determination producing part 8 is constituted of a computer (CPU or MPU) for executing software (program) of realizing a processing of a method for extracting an upward compatible program.

The processings of the same program retrieving part 3 and the difference extracting part 4 are performed in the same manner as described in the first embodiment. It is assumed that the same program retrieving part 3 detects that the pre-recorded program having meta data shown in FIG. 10 is the same as the program scheduled to be broadcast and that the difference extracting part 4 extracts sound language and subtitle language as differences. Here, the meta data of the name of program, the name of director, and the name of leading performer are used for the same program retrieval, and subtitle, sound language, and production information are used for extracting the difference. The superiority/inferiority determining part 5 determines the superiority or inferiority of both of the programs by the use of these extracted differences and the criterion of determination 6 produced by the criterion-of-determination producing part 8.

The criterion of determination producing part 8 produces the criterion of determination 6 by the use of the meta data of the user's operation history and the target program of the operation.

Figure 11:
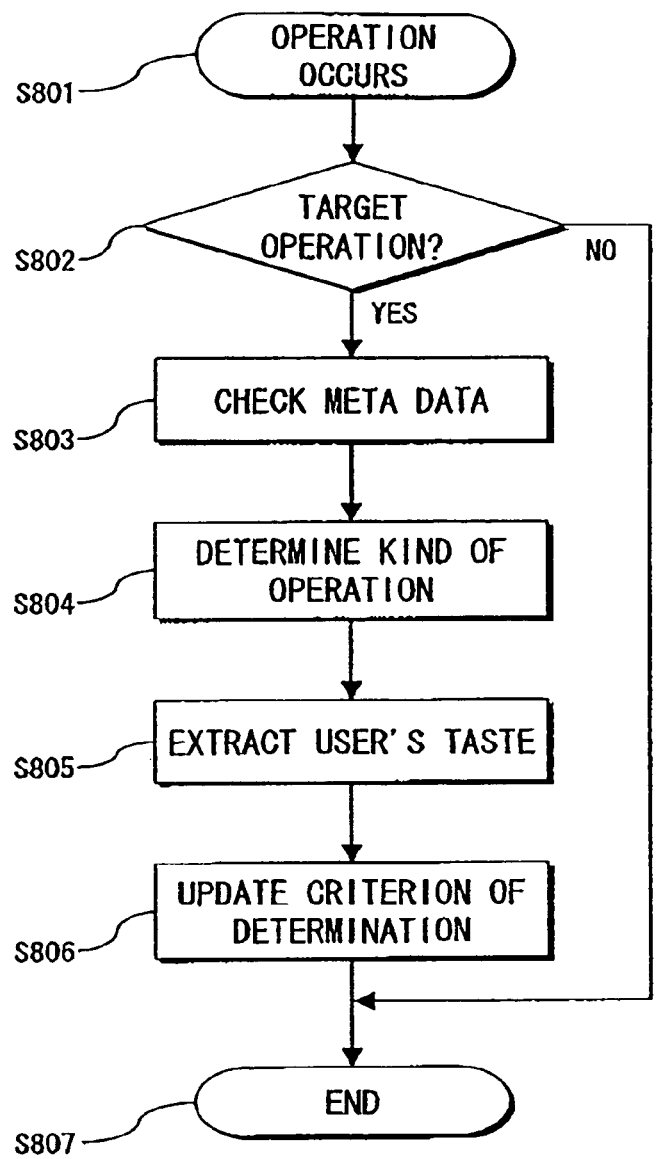
FIG. 11 is a flow chart of a processing of producing a criterion of determination in the second embodiment.

In FIG. 11 is shown a flow chart of a processing of producing a criterion of determination. When a user's operation occurs (S801), it is checked whether or not this operation is an operation used for producing the criterion of determination (S802). A method for sensing the user operation includes the analyzing of remote control information and the acquiring of operating conditions of applications such as EPG and the reproduction of a pre-recorded program. The user's operation includes the viewing and recording of a broadcast program, the making a reservation of viewing or recording a program scheduled to be broadcast, and the reproducing or erasing of a recorded program. The user's operation used for extracting the user's taste is arbitrarily determined and it is set in advance, for example, that of the operations occurring at the time of browsing the EPG, operations related to the selection of station, the reservation of viewing, and the reservation of recording are used for extracting the user's taste and that operations related to the sorting of programs and the displaying of programs in detail are not used for extracting the user's taste.

If a user's operation is an operation used for extracting user's taste (YES at S802), the meta data of a target program of the operation is acquired (S803). If the user's operation is not an operation used for extracting the user's taste (NO at S802), nothing is performed (S807).

If the target program of the operation is a program scheduled to be broadcast or a program now on the air, meta data is acquired from the part 1 for holding the meta data of a program scheduled to be broadcast. If the target program of the operation is a pre-recorded program, meta data is acquired from the part 2 for holding the meta data of a pre-recorded program.

When the meta data is acquired, the user's operation is brought into correspondence with meta data to determine the kind of operation (S804). The kinds of operations may include not only operations of kinds that are clear when operations are performed such as viewing and reproduction but also more detailed operations. Examples of the detailed operation like this include time that elapses until a recorded program is reproduced in the case of the recorded program (three hours or three days later) and instructions for reproducing a program (all single-speed reproduction and half-way high-speed reproduction). By analyzing the user's operation and the meta data in correspondence with each other, the kinds of operations including detailed level are determined (S804).

A user's taste is extracted by the use of the operation information determined in this manner and the acquired meta data (S805). To extract the user's taste is to extract the user's taste for a program by the use of the meta data of a program corresponding to operations such as viewing and recording a program. A method for extracting the user's taste includes various methods such as a method for extracting user's taste by paying attention to the specific meta data of programs viewed or recorded by the user and by using the frequency of operations viewing or recording (for example, the user viewed sport programs 10 times but movies twice) and a method for extracting the user's taste by subjecting the respective meta data of the programs viewed or not viewed by the user to a mechanical learning processing.

A method for extracting the user's taste in this embodiment is not limited to a specific method and can extract the user's taste in the set values of the respective meta data (for example, user likes original sound more than dubbed sound at the time of recording a movie program) and can extract the user's taste between meta data (for example, the user places importance on the presence or absence of segment information more than live or not live in a sport program) for programs in one or more specific genres.

When the user's taste between meta data and between the set values of meta data are extracted, the criterion of determination 6 is produced or updated by the use of these user's taste (S806).

The criterion of determination 6 may be updated every time the operation used for extracting user's taste occurs or may be updated periodically (at 5 o'clock every morning or every three hours). The updated criterion of determination 6 is stored in the device or software mounted with the method for extracting an upward compatible program.

The superiority/inferiority determining part 5 makes a superiority/inferiority determination by the use of the criterion of determination 6 produced in this manner. A sound language and a subtitle language are extracted as differences in the example shown in FIG. 10, but if the user tends to like subtitle rather than dubbing from the extraction result of the user's taste, the program scheduled to be broadcast becomes an upward compatible program. When the program scheduled to be broadcast becomes an upward compatible program, the result notifying part 7 notifies the user that an upward compatible program is scheduled to be broadcast.

According to the above embodiment, by retrieving the same programs and extracting difference by the use of meta data of the pre-recorded program and the program scheduled to be broadcast and by making the superiority/inferiority determination by the use of the criterion of determination based on the user's taste extracted from the meta data of the operation of the user and the target program of the operation, an upward compatible program for the user can be extracted without the user's explicit instruction. Further, even when the user's taste changes, an upward compatible program for the user can be extracted according to the changed user's taste.

Third Embodiment

Figure 12:
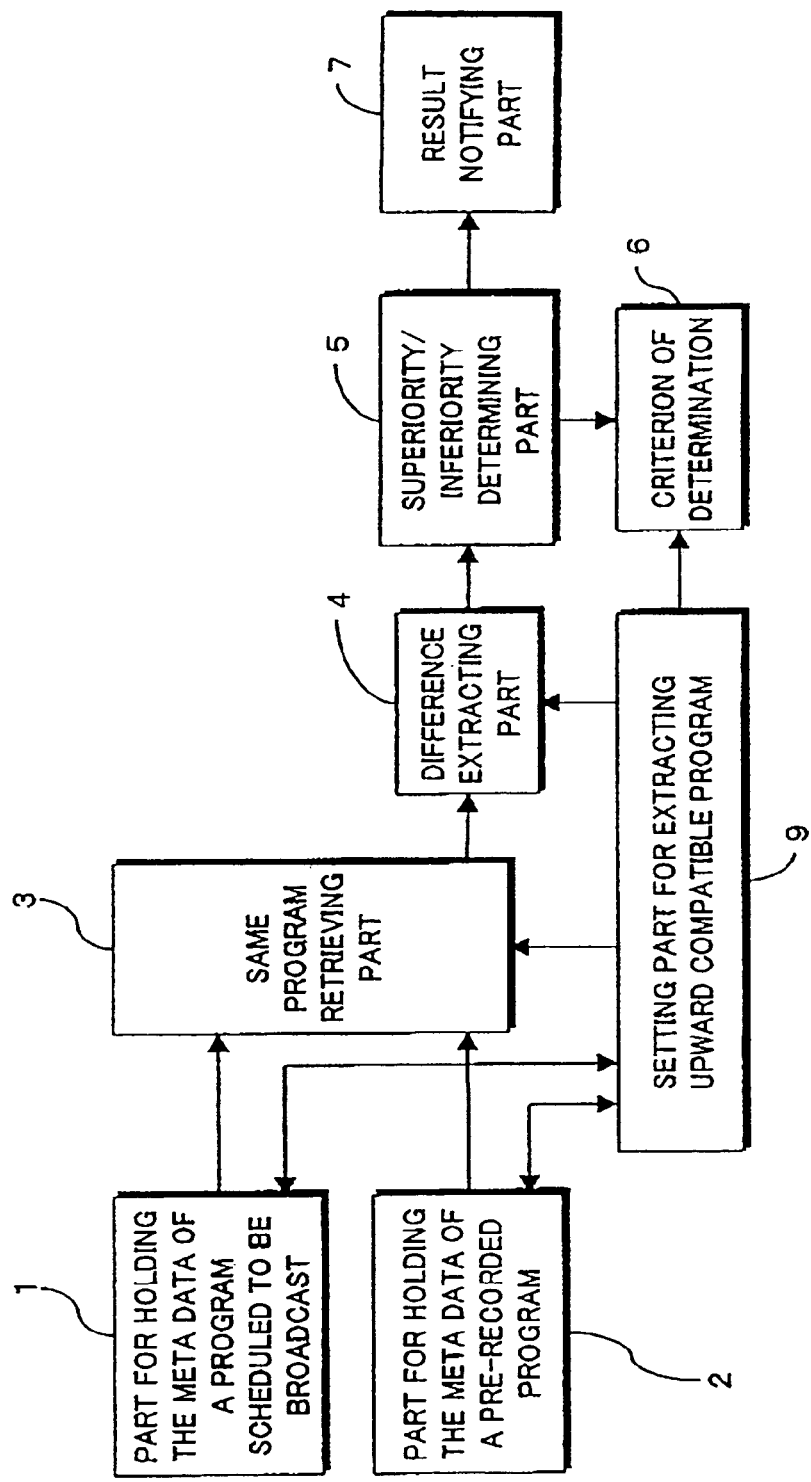
FIG. 12 is a function block diagram of a method for extracting an upward compatible program in the third embodiment.

In this third embodiment there will be described a case where the user's taste is used for retrieving the same program and extracting difference. FIG. 12 is a function block diagram of a method for extracting an upward compatible program, to which the third embodiment of the invention is applied. Here, the function blocks of FIG. 12 overlapping FIG. 1 and FIG. 9 are denoted by the same reference numerals.

As shown in FIG. 12, a plurality of pre-recorded programs are stored in an accumulation region (not shown) and the meta data of these pre-recorded programs are stored in the part 2 for holding the meta data of a pre-recorded program. The meta data of programs scheduled to be broadcast is stored in the part 1 for holding the meta data of a program scheduled to be broadcast.

The meta data of the program scheduled to be broadcast is data transmitted as a broadcast wave and is periodically updated. The same program retrieving part 3 retrieves a program scheduled to be broadcast having the same contents as a pre-recorded program by the use of the meta data stored in the part 2 for holding the meta data of a pre-recorded program and the part 1 for holding the meta data of a program scheduled to be broadcast. The processing of the same program retrieving part 3 is performed in the same manner as described in the first embodiment, and the genre and meta data handled by the same program retrieving part 3 are determined by a setting part 9 for extracting an upward compatible program.

When there is a program scheduled to be broadcast having the same contents as a pre-recorded program, the difference extracting part 4 extracts the difference in broadcast conditions by the use of the meta data of both of the programs. The processing of the difference extracting part 4 is performed in the same manner as described in the first embodiment and the meta data operated by the difference extracting part 4 is determined by the setting part 9 for extracting an upward compatible program. When difference is extracted, the superiority/inferiority determining part 5 determines the superiority or inferiority of both of the programs by the use of the criterion of determination 6 produced by the setting part 9 for extracting an upward compatible program. When the program scheduled to be broadcast holds superiority as the result of determination by the superiority/inferiority determining part 5, the result notifying part 7 notifies the determination result to the user.

The setting part 9 for extracting an upward compatible program sets the genre and the meta data handled by the same program retrieval, the meta date handled by the difference extraction, and the criterion of determination 6 used for the superiority/inferiority determination.

Here, the setting part 9 for extracting an upward compatible program is constituted of a computer (CPU or MPU) for executing software of realizing a processing of a method for extracting an upward compatible program.

Figure 13:
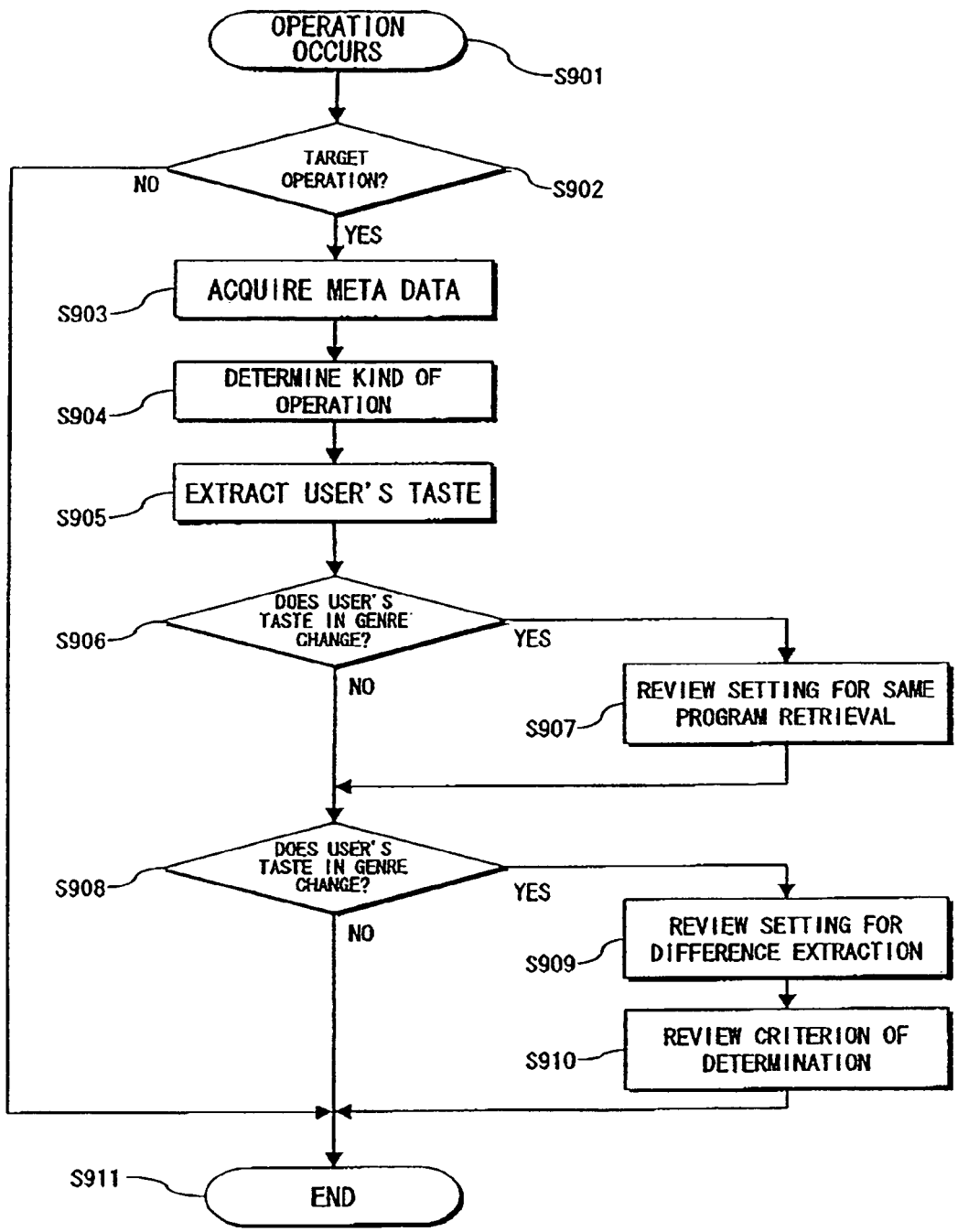
FIG. 13 is a flow chart of a setting processing for the extracting of an upward compatible program in the third embodiment.

In FIG. 13 is shown a flow chart of a setting processing of extracting an upward compatible program.

If a user's operation occurs (S901), it is checked whether or not this operation is an operation used for producing the criterion of determination (S902). If the user's operation is an operation used for extracting the user's taste (YES at S902), the meta data of the target program of the operation is acquired (S903). If the user's operation is not an operation used for extracting the user's taste (YES at S902), nothing is performed (S910).

If the target program of the operation is a program scheduled to be broadcast or a program now on the air, meta data is acquired from the part 1 for holding the meta data of a program scheduled to be broadcast. If the target program of the operation is a pre-recorded program, meta data is acquired from the part 2 for holding the meta data of a pre-recorded program.

When the meta data is acquired, the user's operation is brought into correspondence with the meta data to determine the kind of operation (S904). The user's taste is extracted by the use of the information of this determined operation and the acquired meta data (S905). A method for extracting the user's taste in this embodiment is not limited to a specific method, but it is assumed that the method can extract the user's taste in the set values of the respective meta data and user's taste between the meta data for a program of one or more specific genre.

It is checked for the taste between the extracted meta data and the taste between the set values of the meta data whether or not there is a change in the user's taste related to the genre of a program (S906) A change in the user's taste related to the genre of a program means a case where genre increases in the number of kinds, for example, the user having viewed only sport programs until now and drama programs comes to view music programs, a case where genre is switched, for example, the user does not view a drama program but comes to view music programs, and a case where genre decreases in the number of kinds, for example, the user comes to view only sport programs. It is also recommendable to check whether or not there is a change in the user's taste related to not only the genre of the program but also the sub-genre.

A change in the user's taste related to the sub-genre means, for example, a case where the user having viewed baseball programs mainly until now comes to view football programs mainly. If the user's taste related to the genre of the program changes (YES at S906), the setting of meta data to be used by the same program retrieving part 3 is reviewed (S907).

Even if the user's taste related to the genre of the program changes (YES at S906) or does not change (NO at S906), it is checked whether or not there is a change in the user's taste related to the respective target genres of the same program retrieving part 3 (S908). A change in the user's taste related to the respective genres means a case where a user having viewed a movie program with dubbed sound comes to view the movie program with original sound and subtitle or a case where a user comes to view a baseball program ready for data broadcast.

If the user's taste related to the respective genres changes (YES at S908), the setting of meta data used by the difference extracting part 4 is reviewed (S909) and the criterion of determination 6 used by the superiority/inferiority determining part 5 is reviewed (S910).

If the user's taste related to the respective genres does not change (NO at S908), nothing is performed (S911). The updating of the criterion of determination 6 by the setting part 9 for extracting an upward compatible program may be performed every time an operation used for extracting the user's taste occurs or may be performed periodically (at 5 o'clock every morning or every 3 hours). The updated criterion of determination 6 is held by a device or software mounted with the method for extracting an upward compatible program.

The superiority/inferiority determining part 5 makes a superiority/inferiority determination by the use of the reviewed criterion of determination 6. When the program scheduled to be broadcast is an upward compatible program, the result notifying part 7 notifies the user that the upward compatible program is scheduled to be broadcast.

According to the above embodiment, in the processing of extracting an upward compatible program in which the same program retrieval, the difference extraction, and the superiority/inferiority determination are performed by the use of the meta data of the pre-recorded program and the program scheduled to be broadcast, by performing the same program retrieval, the difference extraction, and the superiority/inferiority determination based on the user's taste extracted from the user's operation and the meta data of the target program of the operation, an upward compatible program for the user can be extracted without user's explicit instruction. Further, even if the user's taste changes, an upward compatible program for the user can be extracted according to the changed user's taste.

Fourth Embodiment

The method for extracting an upward compatible program is not limited to broadcast-based contents broadcast from a broadcast station but is applied also to streaming-based contents transmitted via the Internet or the like. Further, the method can be applied also to user's individual contents (for example, data of photo shooting by a digital camera or a digital video camera), if related information (for example, date and conditions of photo shooting, and title) accompanies these contents.

Fifth Embodiment

In the fifth embodiment will be described a case where the meta data of all compatible programs in which differences are extracted is provided to the user without making the superiority/inferiority determination.

Figure 14:
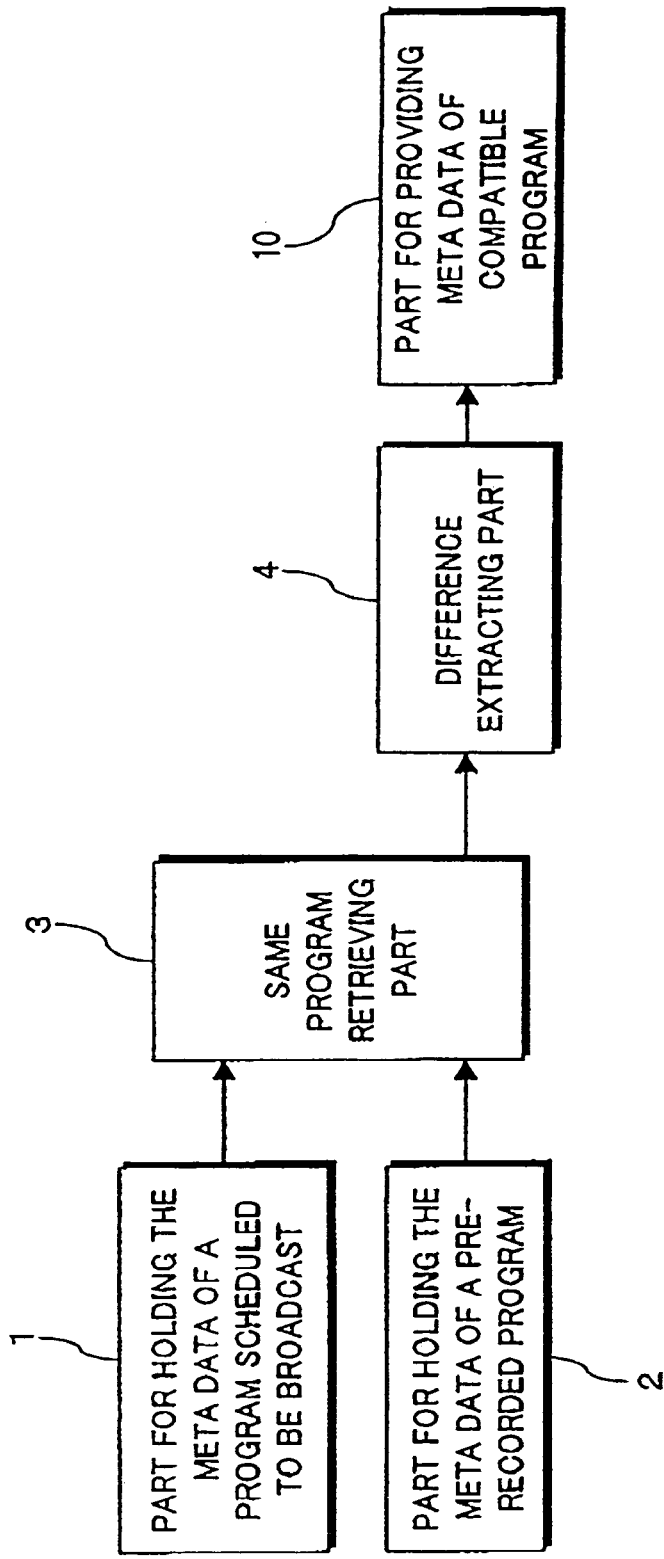
FIG. 14 is a function block diagram of a method for extracting an upward compatible program in the fifth embodiment.

In FIG. 14 is shown a function block diagram of a method for extracting a compatible program, to which the fifth embodiment of the invention is applied. The function blocks of FIG. 14 overlapping FIG. 1, FIG. 9, and FIG. 12 are denoted by the same reference numerals.

A plurality of pre-recorded programs are stored in an accumulation region (not shown) and the meta data of these pre-recorded programs is stored in the part 2 for holding the meta data of a pre-recorded program. The meta data of the programs scheduled to be broadcast is stored in the part 1 for holding the meta data of a program scheduled to be broadcast. The meta data of the program scheduled to be broadcast is data transmitted as a broadcast wave and is periodically updated.

The same program retrieving part 3 retrieves a program scheduled to be broadcast having the same contents as a pre-recorded program by the use of the meta data stored in the part 2 for holding the meta data of a pre-recorded program and the part 1 for holding the meta data of a program scheduled to be broadcast. When there is a program scheduled to be broadcast having the same contents as a pre-recorded program, the difference extracting part 4 extracts difference in broadcast conditions by the use of the meta data of both of the programs. When the difference is extracted, a part 10 for providing the meta data of a compatible program provides meta data related to these programs.

Here, the part 10 for providing the meta data of a compatible program can be constituted in various manners according to a providing method and, for example, is constituted of a display or the like. Such an apparatus for extracting a compatible program that includes the part 1 for holding the meta data of a program scheduled to be broadcast, the part 2 for holding the meta data of a pre-recorded program, the same program retrieving part 3, and the difference extracting part 4 can be constituted, for example, as an image recording apparatus such as a hard disk recorder, and an image recording apparatus that further includes a display device provided with a display as the part 10 for providing the meta data of a compatible program or still further includes a tuner for receiving broadcast in addition to the display device, but is not limited to this apparatus.

The processings of the same program retrieving part 3 and the difference extracting part 4 are the same as those described in the first embodiment. The part 10 for providing the meta data of a compatible program provides at least meta data used for the same program retrieval and meta data used for the difference extraction. In FIG. 15 is shown examples of the meta data of compatible programs. Here, FIG. 15 has contents corresponding to the contents in FIG. 4.

The meta data shown in FIG. 15 includes: the date and time of the description, the site of description, and sub-genre that are used for the same program retrieval; the duration of program, live flag, the name of commentator, the name of play-by-play announcer, and the presence or absence of segment information that are used for difference extraction; and the title of program and the channel of the meta data related to the broadcast mode of the contents of program. The user can make a reservation of recording a program scheduled to be broadcast or erase a pre-recorded program by comparing the provided meta data.

The meta data provided by the part 10 for providing the meta data of a compatible program may be all or a part of meta data belonging to the compatible programs. In the case of providing a part of meta data, a determination of which meta data is to be provided may be made based on a user's specification or a user's taste. For example, if the user does not mind the name of a commentator and the name of a play-by-play announcer that are provided in the example shown in FIG. 15, the meta data of these items has little effect on the way that the user handles the extracted compatible program, so that these meta data does not need to be provided to the user.

According to the above embodiment, if there is difference between the pre-recorded program and the program scheduled to be broadcast when retrieving the same programs by the use of the meta data of the same programs and by extracting difference between the same programs, the user can easily make a determination about the handling of the extracted compatible programs by providing the meta data of both of the programs.

The meta data transmitted as a broadcast wave includes content meta data that is information related to the contents of the program and instance meta data that is information related to a mode in which the program content is broadcast.

Information included in the content meta data includes not only title and genre but also credit information of the content (name of producer and names of performers), production information of content (year of production, country of production), description information of content (age and site), and information related to audience (limitation to audience and audience envisioned). Information included in the instance meta data includes broadcast schedule information (date and time of broadcast, live broadcast, repeat of program), and information related to the program (title of program, attributes of image and sound).

In this invention, it is assumed that the content meta data is used for retrieving the same program, that meta data not used for retrieving the same program is used for extracting difference, that at least the meta data used for extracting difference is used for providing the compatible program, and that the meta data used for extracting difference is used for making a superiority/inferiority determination.

This application claims priority from Japanese Patent Application No. 2003-408001 filed Dec. 5, 2003, which is hereby incorporated by reference herein.

What is claimed is:

1. A method of selecting a program among a plurality of programs in order to replace a pre-recorded program with a selected program, the method comprising the steps of:
retrieving meta data of a scheduled program to be broadcast at some future time, the meta data including items of information related to content of the program and a mode in which the program content is broadcast;
comparing a predetermined item of meta data of the scheduled program with an item of meta data of a pre-recorded program to determine whether the scheduled program and the pre-recorded program have the substantially same content, wherein the meta data of the pre-recorded program is only meta data that is received when the pre-recorded program was broadcast;
extracting a difference in modes of broadcast between the scheduled program and the pre-recorded program based on a comparison result of the meta data of the scheduled and the pre-recorded programs in the event that they are determined to have the substantially same content at the comparing step;
providing a user with the modes of broadcast included in the meta data of both of the programs in the event that there is a difference between them;
assigning to a plurality of different items an order of priority based on information of a user's taste and comparing the meta data of the scheduled and pre-recorded programs having the substantially same content; and
determining whether the scheduled program is preferred to the pre-recorded program based on the order of priority and a result of the comparison,
wherein the step of providing meta data to the user is executed in the event that the scheduled program is determined to be preferred to the pre-recorded program.

2. The method according to claim 1, wherein said selection is performed on the basis of weight assigned to each difference in meta data according to the order of priority.

3. The method according to claim 1, wherein the order of priority is set according to a genre of the program.

4. The method according to claim 1, wherein the information of the user's taste is information estimated based on information set by the user and/or information of the user's operation history.

5. An apparatus for selecting a program among a plurality of programs in order to replace a pre-recorded program with a selected program, the apparatus comprising:
a same program retrieving part for retrieving meta data of a scheduled program to be broadcast at some future time, the meta data including items of information related to content of the program and a mode in which the program content is broadcast, and for comparing a predetermined item of meta data of the scheduled program with a item of meta data of a pre-recorded program to determine whether the scheduled program and the pre-recorded program have the substantially same content, wherein the meta data of the pre-recorded program is only meta data that is received when the pre-recorded program was broadcast;
a difference extracting part for extracting a difference in modes of broadcast between the scheduled program and the pre-recorded program based on a comparison result of the meta data of the scheduled and the pre-recorded programs in the event that they are determined to have the substantially same content by the same program retrieving part; and
a determining part for determining whether the scheduled program is preferred to the pre-recorded program in the event that a difference is extracted,
wherein the determining part has functions of:
(a) assigning to a plurality of the items an order of priority based on information of a user's taste;
(b) comparing the meta data of the scheduled and pre-recorded programs having the substantially same content; and
(c) determining whether the scheduled program is preferred to the pre-recorded program based on the order of priority and a result of the comparison.

6. The apparatus according to claim 5, which is configured such that the determination is performed on the basis of weight assigned to each difference in meta data according to the order of priority.

7. The apparatus according to claim 5, which is configured such that the order of priority is set according to a genre of the program.

8. The apparatus according to claim 5, which is configured such that the information of the user's taste is information estimated based on information set by the user and/or information of the user's operation history.

9. The apparatus according to claim 5, further comprising a notification part suitable for notifying the result of the determination to the user.

* * * * *